United States Patent
Ghaemaghami Rad

(10) Patent No.: US 7,556,742 B1
(45) Date of Patent: Jul. 7, 2009

(54) DEICING AND ANTI-ICING COMPOSITION HAVING ANTI-CORROSION PROPERTIES AND METHOD FOR MAKING SAME

(76) Inventor: Shahram Ghaemaghami Rad, Shahrak Gharb, Blvd Farahzad, Taher Khani, Parastoo 4th, #20, Tehran (IR)

( * ) Notice: Subject to any disclaimer, the term of this patent is extended or adjusted under 35 U.S.C. 154(b) by 0 days.

(21) Appl. No.: 12/044,935

(22) Filed: Mar. 8, 2008

(51) Int. Cl.
*C09K 3/18* (2006.01)
(52) U.S. Cl. .......................... 252/70; 106/13
(58) Field of Classification Search ................... 106/13; 252/70
See application file for complete search history.

(56) References Cited

U.S. PATENT DOCUMENTS

| | | | |
|---|---|---|---|
| 2,980,620 A * | 4/1961 | Hatch | 252/70 |
| 4,676,918 A * | 6/1987 | Toth et al. | 252/70 |
| 5,366,650 A * | 11/1994 | Wiesenfeld et al. | 252/70 |
| 5,635,101 A | 6/1997 | Janke et al. | |
| 5,645,755 A * | 7/1997 | Wiesenfeld et al. | 252/70 |
| 5,853,610 A * | 12/1998 | Kaes | 252/70 |
| 5,922,240 A | 7/1999 | Johnson et al. | |
| 6,156,226 A * | 12/2000 | Klyosov et al. | 252/70 |
| 6,861,009 B1 * | 3/2005 | Leist | 252/70 |

FOREIGN PATENT DOCUMENTS

JP 60195178 A * 10/1985
WO WO2005/121271 A1 * 12/2005

* cited by examiner

*Primary Examiner*—Anthony J Green
(74) *Attorney, Agent, or Firm*—Ide Sazane Aryan; Barry ChooBin

(57) ABSTRACT

A de-icing and anti-icing composition in the form of a powder which consists of: Ammonium sulfate (45%); Urea (20%); Magnesium chloride (15%); and Calcium chloride (20%).

2 Claims, No Drawings

DEICING AND ANTI-ICING COMPOSITION HAVING ANTI-CORROSION PROPERTIES AND METHOD FOR MAKING SAME

SPONSORSHIP STATEMENT

The present invention is sponsored by Iranian National Science Foundation.

BACKGROUND OF THE INVENTION

The current state of the art for coping with snow and ice on roads usually involves applying a deicer material such as a salt to the road surface. Sometimes antiskid materials such as sand or other aggregates such as gravel are added with or without a salt.

The use of salt and compositions having high concentrations of salt, cause an undesirable corrosive effect on vehicles, the road surface, and the environment with respect to the run off of water containing salt which contaminates the surrounding land and water.

Considering the above problems associated with salt formulations, there has been a continuing need for a deicing composition or formulation which can effectively melt snow and ice yet which reduces the corrosion and environmental contamination referred to above. In response to the above problems associated with the use of road salt, the prior art has looked to alternative formulations which are less corrosive and more environmentally friendly.

U.S. Pat. No. 5,922,240 (Johnson et al.) relates to a deicing composition comprising brewers' condensed solubles produced, for example, as by-products from a commercial beer brewing process, which by-products are biodegradable. The invention also relates to the use of a deicing composition to reduce the buildup of snow and ice on road, bridges and other outdoor surfaces.

U.S. Pat. No. 5,635,101 (Janke et al.) relates to a deicing composition containing a by-product of a wet milling process of shelled corn. Corn kernels are steeped or soaked in a hot solution containing small amounts of sulfurous acid. The corn kernels are separated from the steep water and steep water solubles are used in the production of a deicing composition.

U.S. Pat. No. 4,676,918 (Toth et al.) relates to a deicing composition which comprises a mixture containing at least one component selected from a number of chlorides or urea and an admixture of waste concentrate of alcohol distilling that has a dry substance content of from 200 to 750 g/kg and from 10% to 80% by weight of water.

The materials described in the above three patents are naturally occurring substances with hundreds (if not thousands) of components such as complex carbohydrates, starches, sugars, proteins etc. and are normally used with a salt.

The above described de-icing solutions which employ agricultural residues e.g., corn based distillers soluble and soluble from the corn wet milling industries, brewers condensed soluble, and distillers condensed soluble are extremely variable in composition, viscosity, film forming tendency, freezing temperature, pH etc., and consequently give varying performance when used in de-icing solutions. Depending upon the source and batch, these materials at low temperatures sometimes exhibit such resistance to flow that they cannot be applied evenly to a road surface or mixed with a chloride, rendering them virtually unsuitable for use.

Furthermore, these patents utilize materials which have highly undesirable or unnecessary ingredients leading to practical difficulties by manufacturers and users, such as stratification in storage, biological degradation, odor, plugging of filters and spray nozzles and environmental difficulties e.g. high biological oxygen demand due to the very high organic contents (about 40% by weight), and the presence of phosphorus compounds, cyanide and heavy metals.

To improve quality and performance, and to meet current mandated standards, there has been a continuing need for a source of carefully controlled residuals and by-products which exhibit improved performance and reduce metal corrosion, spilling of concrete, toxicity and address environmental concerns.

SUMMARY OF THE INVENTION

It is therefore an object of the present invention to provide a deicing formulation which exhibits improved performance standards which overcomes the prior art problems described above.

It is a further object of the present invention to provide a deicing formulation which does not cause any chemical reaction to form any type of acid.

It is another object of the present invention to provide a deicing formulation which does not harm environment and does not harm vehicle's body.

It is another object of the present invention to provide for an improved ice melting properties that exhibits less corrosion.

It is a further object of the present invention to provide a deicing formulation which provides consistent physical and chemical properties, thereby assuring consistent quality and performance.

It is another object of the present invention to provide an economical, highly effective deicing formulation.

DETAILED DESCRIPTION OF THE INVENTION

In the producing process of polymeric asphalt, anti snow and anti freeze powder can be added to its material (in final stages) and thus preventing the surfaces from freezing.

As it is well known, at least two methods, i.e. chemical and physical methods, are applied to improve the quality of bitumen and manufacturing polymeric bitumen all over the world. Addition of poly phosphoric acid, sulfuric acid, nitric acid, and oxides of some metals are the procedures used in the chemical method. In the physical method materials such as soot, rubber powder, sulfur, etc. are added to bitumen. Also it is possible to add the materials of this powder to the materials of polymeric asphalts, especially in the upper surfaces, to produce asphalt which is anti freeze by itself and resists against freezing to a large extent. This kind of road pavement can be applied in important and key places such as airport runways or highways. The important point is that if we manage to prevent heavy snows from accumulating and freezing on the roads, we won't have subsequent problems of road snow sweeping and cleansing, and this means a large amount of time and expense saving as well as providing more traffic safety when it is raining or snowing.

Production and application of polymeric asphalt is a clear and certain issue, but if we add 40% of anti freeze and anti snow powder per 6 cubic meters while it is being produced and the materials are being, and then make it smooth with the roller, we can produce an asphalt safe from being covered by snow and freezing to a large extent.

The present invention deicing formulation may be used for preventing the road and pavement surfaces from slipperiness as well as for removing icing materials.

It is also useful for preventing heavy snow to accumulate on any kind of paths including asphalt, stone paved, concrete etc. If we cover the related surfaces with this powder while it is snowing, there will be no accumulation of snow. When the weather condition is so that icing and freezing might occur, using this powder will prevent the ice to be formed on the above mentioned surfaces. The present invention formulation/composition has preventive features that prevent the roads and paths from slipperiness. Even if there is some ice formed and we use this material a short time later, the slipperiness will be removed.

The present invention composition can be used at the temperatures down to −30° C. and it can prevent the covered site from freezing for 48 hours.

The present invention composition is very cost effective and simple to use.

The manufacturing process of the present invention is simple and quick. It doesn't affect or damage the asphalt or concrete since it doesn't generate acid after being combined with water molecules, nor does it affect or harm man, plants, creatures and environment.

Manufacturing Process:

Raw materials consist of:

Ammonium sulfate (45%);

Urea (20%);

Magnesium chloride (15%); and

Calcium chloride (20%):

Ammonium sulfate and urea are common ice melting compounds that are often perceived as safer products to use around vegetation. Both need to be used at a slightly higher rate of application, with urea melting to (15 degrees f). Urea does not contain chlorides, so it is less corrosive and safer for use on concrete containing rebar and around steel structures.

Magnesium Chloride (15%):

Magnesium chloride is considered as the best total antifreeze and ice-melting compounds that corrodes metal surfaces less. Magnesium chloride protects concrete from spilling more; it is less toxic and environmentally safer than sodium chloride (rock salt). Magnesium is less irritating to the skin.

Magnesium corrodes metal surfaces less. Magnesium is safer around vegetation. Magnesium is safer on concrete and is safer around animals and humans.

Calcium Chloride (20%):

Small, white pellets processed from naturally occurring material.

Calcium chloride has unique properties that make it ideal for maintaining unpaved roads and fortifying road bases for new construction. It is calcium chlorides ability to regulate moisture on road surfaces that is the key to building roads that last.

Calcium chloride keeps roads moist, day-in and day out, keeping nuisance dust down. Reduced pot-holing and rutting made possible by calcium chloride surface stabilization makers roads safer year round.

Stabilized calcium chloride roads can reduce aggregate loss by up to 75%.

In addition, they significantly reduce the frequency and costs associated with periodic grading. Uniform compaction and residual calcium chloride helps protect road bases from winter freezing and related frost heaving. Long known as an effective ice melting compounds and antifreeze, calcium chloride lowers the freezing point of moisture in road bases to nearly 60 degrees below zero.

Calcium chloride protection of unpaved roads and road bases is cumulative and long-tasting. The migration of calcium chloride from road bases is minimal studies have shown that calcium chloride is still present and providing stabilization in road sub-bases nearly 30 years after initial construction.

The above mentioned substances are ground by a mill and then turned into a fine and even powder via a mixing machine. After being mixed, it is poured on the surfaces. Each kilo gram of the present invention composition is sufficient for a surface of 4 square meters of ice and snow. Its retention period is about 48 hours and it keeps its properties for this period. The applicable temperature is—30° C. Using it is very economical.

Application cases: municipalities, road keeping offices, airports, military sites, universities, shops, ports, offices, factories, houses etc.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. A method of forming a de-icing and anti-icing composition which consists of:
   grinding materials, wherein said materials consists of:
   Ammonium sulfate 45% by weight of said composition,
   Urea 20% by weight of said composition,
   Magnesium chloride 15% by weight of said composition, and Calcium chloride 20% by weight of said composition;
   Mixing said ground materials to form a deicing and anti-icing powder.

2. A de-icing and anti-icing composition which consists of:
   Ammonium sulfate 45% by weight of said composition;
   Urea 20% by weight of said composition;
   Magnesium chloride 15% by weight of said composition; and
   Calcium chloride 20% by weight of said composition, wherein said de-icing and anti-icing composition is used on driveways, sidewalks, airports runways, freeways, and roads.

* * * * *